United States Patent [19]

Tamai

[11] Patent Number: 4,807,135
[45] Date of Patent: Feb. 21, 1989

[54] POWER SUPPLY CONTROL DEVICE FOR AUTOMOTIVE ELECTRONIC CONTROL SYSTEM

[75] Inventor: Hidefumi Tamai, Ebina, Japan

[73] Assignee: Isuzu Motors Limited, Tokyo, Japan

[21] Appl. No.: 933,130

[22] Filed: Nov. 21, 1986

[30] Foreign Application Priority Data

Nov. 22, 1986 [JP] Japan .................... 60-263460

[51] Int. Cl.$^4$ ............................. B60K 28/10
[52] U.S. Cl. ................. 364/424.05; 364/483; 364/424.1; 340/52 R
[58] Field of Search ............ 364/424, 431.1, 483, 364/424.1; 340/52 R; 371/12; 192/3.58, 0.092, 0.033; 123/399; 180/176, 179; 74/866

[56] References Cited

U.S. PATENT DOCUMENTS

| | | | |
|---|---|---|---|
| 4,258,421 | 3/1981 | Juhasz et al. | 364/424 |
| 4,451,890 | 3/1984 | Suzuki et al. | 180/176 X |
| 4,476,530 | 10/1984 | Pannier et al. | 74/866 X |
| 4,484,307 | 11/1984 | Quatse et al. | 364/900 |
| 4,491,112 | 1/1985 | Kanegae et al. | 123/399 X |
| 4,601,369 | 7/1986 | Hattori et al. | 192/3.58 |

OTHER PUBLICATIONS

English Abstract of Japanese Patent 59-132018 dated 7/30/84.
English Abstract of Japanese Patent 59-171744 dated 9/28/84.
English Abstract of Japanese Patent 57-191724 dated 11/25/82.
English Abstract of Japanese Patent 59-171743 dated 9/28/84.

*Primary Examiner*—Gary Chin
*Attorney, Agent, or Firm*—Staas & Halsey

[57] ABSTRACT

A power supply control device is provided which supplies electric power to an automobile electronic control system, including a microcomputer, which controls devices on an automobile, such as a gear transmission, a clutch, etc. A power supply for the electronic control system is connected to a self-holding device for continuously supplying electric power to the electronic control system even if a key switch is turned off in error, resulting in a power cutoff. When the power is cut off inadvertently or intentionally, the electronic control system detects such a power cutoff, and effects a predetermined control operation. Upon completion of the operation, the electronic control system turns off the self-holding device to cut off the electric power supplied to the electronic control system.

21 Claims, 10 Drawing Sheets

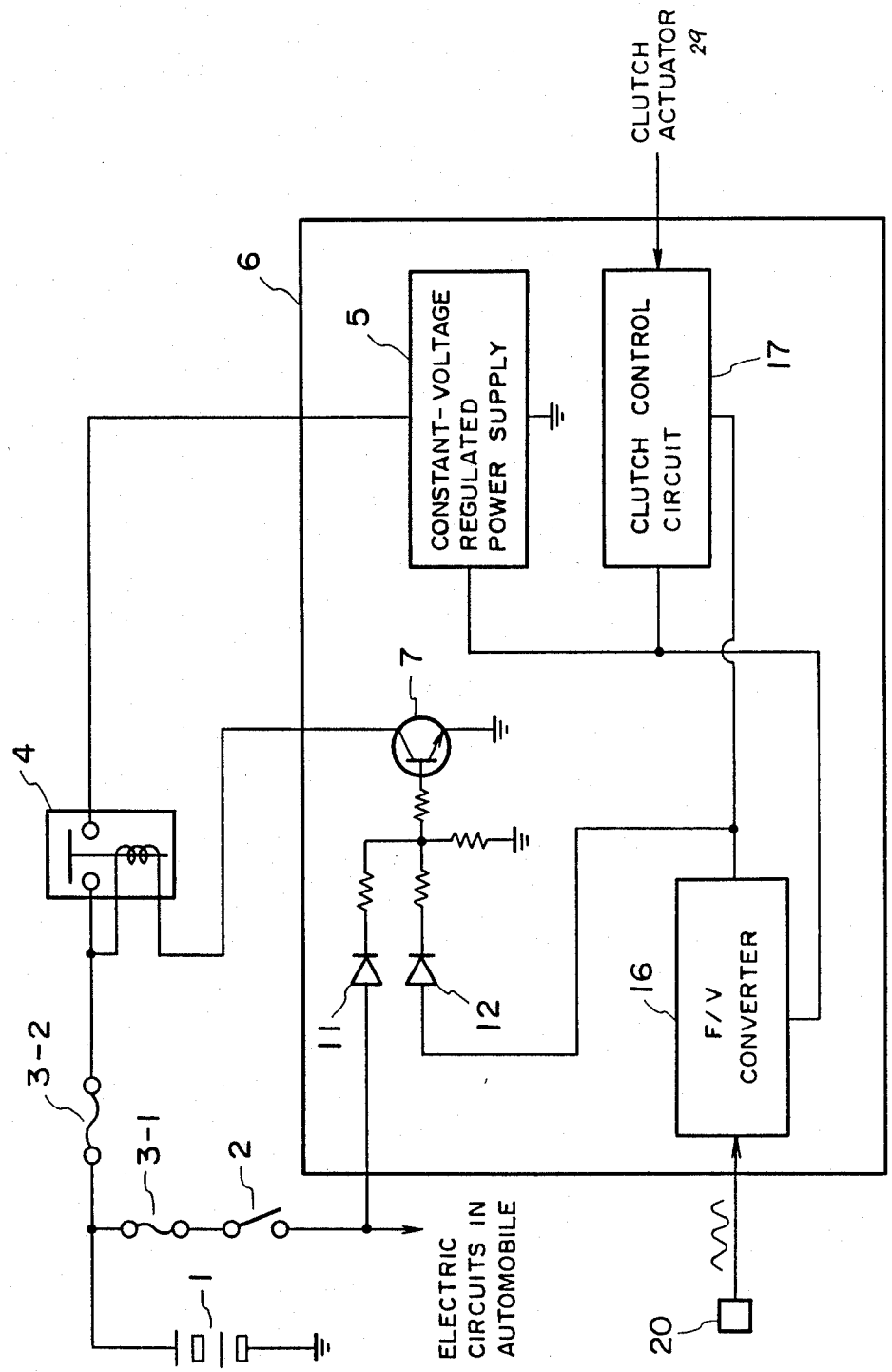

POWER SUPPLY CONTROL DEVICE FOR AUTOMOTIVE ELECTRONIC CONTROL SYSTEM

BACKGROUND OF THE INVENTION

The present invention relates to a power supply control device for use with an electronic control system, and more particularly to a power supply control device having a self-holding circuit, for use with an automotive electronic control system.

Various automobiles ranging from passenger cars to large-size trucks are now being controlled by electronic control systems including microcomputers. One representative example of such an electronic control system is disclosed in U.S. Pat. No. 4,601,369. According to the disclosed system, the depth to which an accelerator pedal is depressed and the automobile speed are detected at all times, and a gear transmission position is determined from the detected pedal depth and speed for changing transmission gears. In synchronism with changing transmission gears, a clutch is also controlled by the control system as if human intervention were involved.

In this conventional electronic control system for such automotive control, when a key switch is turned on, a voltage is applied by a battery to a constant-voltage circuit in the electronic control system, and a voltage is applied by the constant-voltage circuit to energize the electronic control system in readiness for operation. When the key switch is turned off, the voltage applied to the constant-voltage circuit is cut off to make the electronic control system inoperative. Therefore, if the key switch is turned off in error or a fuse connected between the battery and the key switch melts, then the following problems will arise:

(1) An electronically controlled gear transmission, an electronically controlled clutch, and other devices that are controlled by the electronic control system will no longer be under control.

(2) Where a power steering system is of the speed-responsive type, operation of the power steering system to control the load on the steered wheels will be interrupted, making the steering wheel feel unduly heavy or light.

SUMMARY OF THE INVENTION

In view of the aforesaid problems of the conventional electronic control system, it is an object of the present invention to provide a device, on an automobile controlled by an electronic control system, for preventing electric power supplied to the electronic control system from being cut off.

Another object of the present invention is to provide a power supply control device for use with an electronic control system for controlling an automobile, the power supply control device including a self-holding circuit for preventing the electronic control system from becoming inoperative when a key switch is operated in error or a fuse is caused to melt while the automobile is running, whereby the electronic control system remains to operable until the automobile is brought to a stop.

To achieve the above objects, there is provided according to the present invention a power supply control device for use with an automotive electronic control system, including: a power supply; a key switch for supplying electric power from the power supply to the electronic control system; a self-holding circuit for keeping the electric power supplied from the power supply to the electronic control system when the key switch is turned off; and a means for turning off the self-holding circuit.

The above and other objects, features and advantages of the present invention will become more apparent from the following description, when taken in conjunction with the accompanying drawings, in which preferred embodiments of the present invention are shown by way of illustrative example.

BRIEF DESCRIPTION OF THE DRAWINGS

FIG. 9 is a schematic circuit diagram of a modification of the embodiment shown in FIG. 2.

DETAILED DESCRIPTION OF THE PREFERRED EMBODIMENTS

Figure 1:
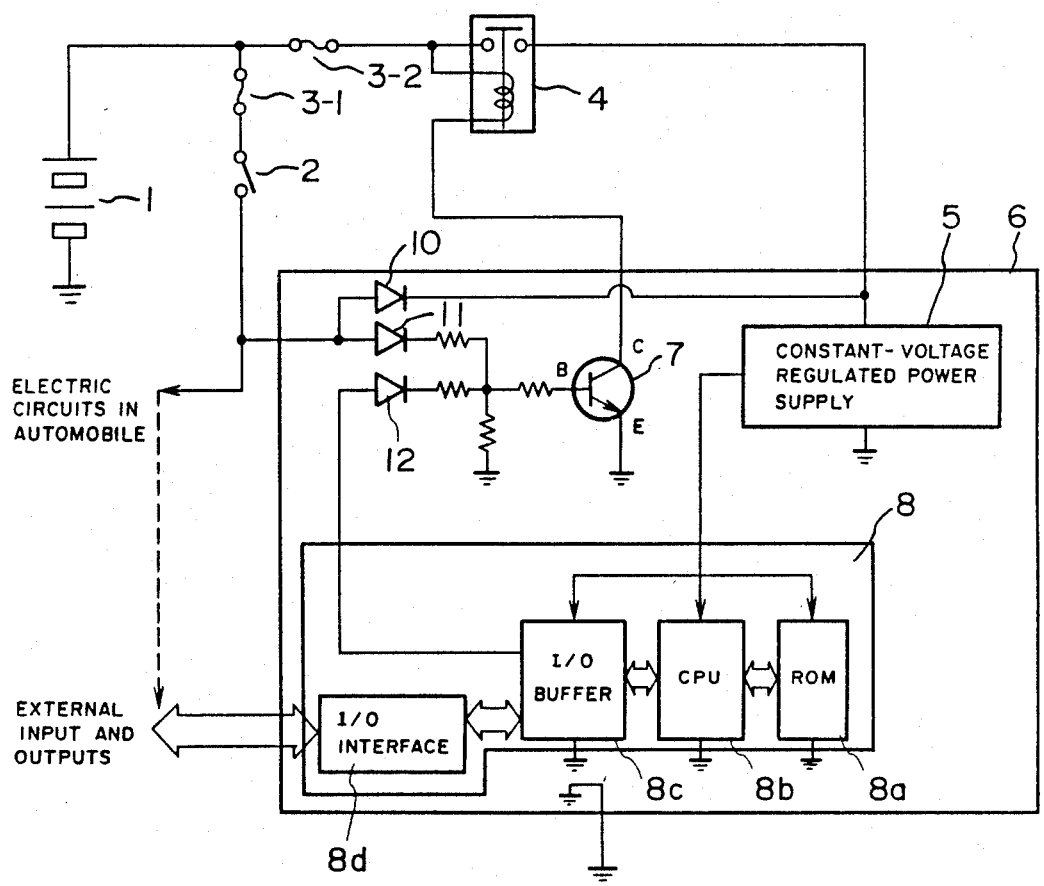
FIG. 1 is a schematic circuit diagram illustrating an embodiment of the present invention.

FIG. 1 is a schematic circuit diagram showing an embodiment of the present invention. A battery 1 for use on an automobile includes an ordinary lead storage battery having an output voltage of 12, 24, or 48 volts. A power supply switch 2 serving as a key switch is turned on when it is in an "accessory" position and a "power-on" or "start" position. The power supply switch 2 will hereinafter be referred to as a "key switch". The battery 1 and the key switch 2 are coupled to fuses 3-1, 3-2, and the fuse 3-2 is coupled to a power supply relay 4 for self-holding a power supply circuit. An electronic control system 6 includes a constant-voltage regulated power supply 5 for converting the output voltage of 12, 24, or 48 volts from the battery 1 to a voltage of 5.5 volts, for example, which is required to drive the electronic control system 6 (described later). The electronic control system 6 also includes: a driver transistor 7 for energizing the power supply relay 4; a microcomputer 8, including a read-only memory 8a, a central processing unit (CPU) 8b, an input/output buffer 8c, and an input/output interface 8d; and diodes 10, 11, 12 for preventing currents from flowing back therethrough.

The circuit arrangement shown in FIG. 1 has self-holding means for continuously supplying electric power to the electronic control system 6 when the key switch 2 is opened, and means for turning off the self-holding means to stop operation of the power supply of the electronic control system 6 when the electronic control system 6 has completed a predetermined sequence of operation after detecting when the electric power supplied to the automobile was cut off inadvertently, or intentionally.

The self-holding circuit will be described below. When the key switch 2 is closed, the voltage of the battery 1 is applied via the key switch 2 and the diode 10 to the constant-voltage regulated power supply 5 to energize the electronic control system 6. At the same time, the voltage is impressed via the diode 11 on the base of the driver transistor 7 to energize the drive transistor 7, thus energizing the relay 4 to close its contacts, whereupon the voltage from the battery 1 is also applied through the relay 4 to the constant-voltage regulated power supply 5. This condition is assumed when the automobile is at rest and about to run, or is running. The microcomputer 8 is supplied with signals from various sensors through the input/output interface 8d and the input/output buffer 8c. The CPU 8b executes various programs stored in the ROM 8a to supply various control signals to different devices on the automobile through the input/output buffer 8c and the input/output interface 8d.

The input/output buffer 8c issues a signal for turning on the driver transistor 7. This signal is applied via the diode 12 to the base of the driver transistor 7 to render the latter conductive. A current now flows through the coil of the power supply relay 4 to close the contacts thereof, so that the voltage from the battery 1 is held and applied to the constant-voltage regulated power supply 5.

In the event that the key switch 2 is turned off in error, or the fuse 3-1 melts, the current supplied to the constant-voltage regulated power supply 5 via the diode 10 and the current supplied to the base of the driver transistor 7 through the diode 11 are cut off. However, since the driver transistor 7 remains energized via the input/output buffer 8c and the diode 12, to keep the power supply relay 4 actuated, the voltage from the battery 1 is continuously applied to the electronic control system 6. The electronic control system 6 is therefore prevented from being de-energized even when the key switch 2 is turned off erroneously or the fuse 3-1 melts.

Figure 2:
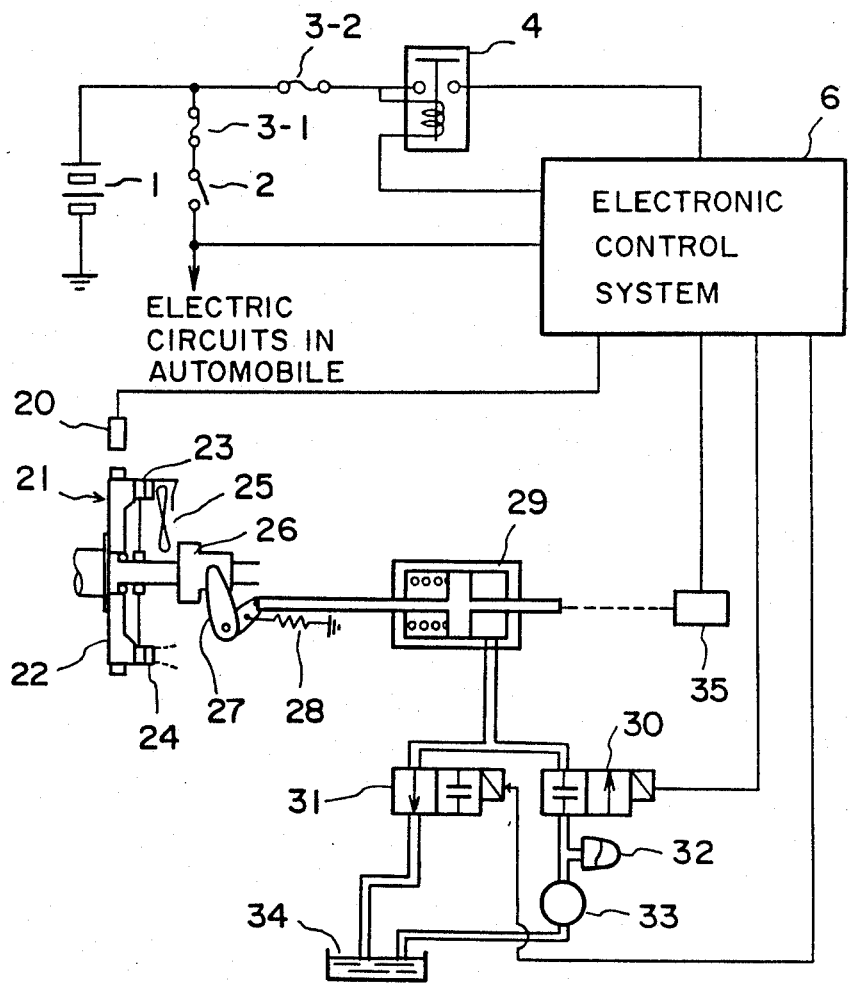
FIG. 2 is a schematic diagram showing another embodiment of the present invention, particularly an electronic control system including means for turning off a self-holding circuit.
Figure 2A:
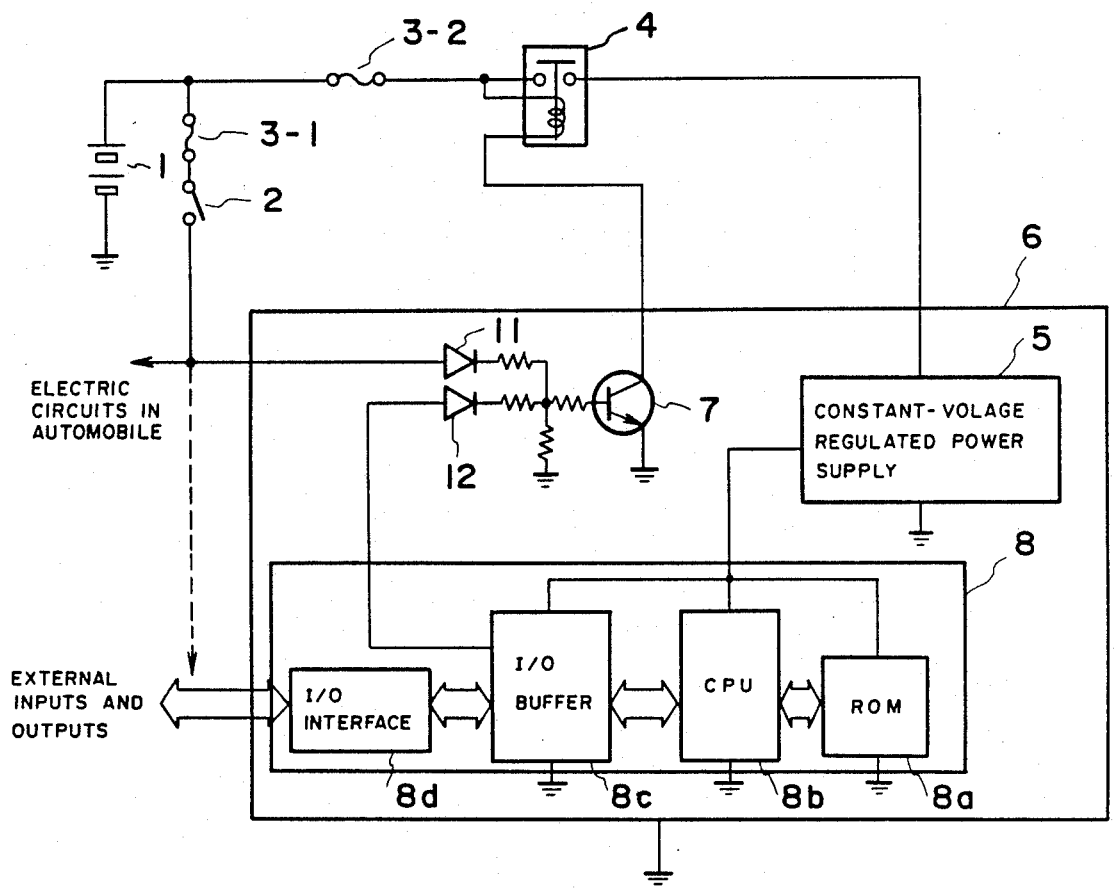
FIG. 2A is a schematic circuit diagram of the electronic control system shown in FIG. 2.

FIG. 2 is a schematic diagram showing another embodiment of the present invention, and FIG. 2A illustrates the internal arrangement of the electronic control system shown in FIG. 2. The means for turning off the self-holding means, which cuts off the electric power supplied to the electronic control system, will now be described in detail with reference to FIGS. 2 and 2A.

In FIG. 2, a clutch mechanism 21 for selectively transmitting engine power includes a flywheel 22, a driven plate 23, a pressure plate 24, a clutch lever 25, a release bearing 26, a release lever 27, and a return spring 28 which normally urges the clutch mechanism to a connected position when there is no fluid pressure supplied to a clutch actuator 29 from a clutch disconnecting valve 30. Designated at 31 is a clutch connecting valve 32, an accumulator 33, a fluid pressure source including a pump, 34 a working fluid tank, and 35 a stroke sensor for detecting the operation stroke of the clutch actuator 29. A detected signal from the stroke sensor 35 is applied to the electronic control system 6. The clutch disconnecting valve 30 and the clutch connecting valve 31 are opened and closed under the control of the electronic control system 6 for disconnecting and connecting the clutch mechanism 21. A rotation signal issued by an engine rotation sensor 20 and indicative of the rotation of the engine is delivered to the electronic control system 6.

Operation of the embodiment shown in FIGS. 2 and 2A is as follows: When the key switch 2 is closed, the electronic control system 6 is continuously supplied with electric power by the self-holding circuit. In the event that the automobile is stopped and the key switch 2 is turned off by the automobile driver, the electronic control system 6 first reads in a rotation signal from the engine rotation sensor 20. Upon confirming that the engine rotation is stopped, the electronic control system 6 sends a command to the clutch connecting valve 31 to reduce the fluid pressure in the clutch actuator 29, allowing the clutch mechanism 21 to be engaged under the resiliency of the return spring 28. Then, the electronic control system 6 reads in a signal from the stroke sensor 35. After confirming that the clutch actuator 29 is in a clutch-connecting position, the current supplied via the diode 12 to the driver transistor 7 (FIG. 2A) is cut off to de-energize the power supply relay 4, thus cutting off the current supplied from the battery 1 to the electronic control system 6. Therefore, after the key switch 2 has been turned off by the driver, the self-holding means which has kept the electronic control system 6 energized is turned off in order to cut off the electric power supplied to the electronic control system 6. The self-holding means and the means for turning off the self-holding means are effective in preventing the clutch mechanism 21 from being connected in the absence of the electric power even if the key switch 2 is turned off before the engine is stopped, so that the automobile is prevented from moving unexpectedly.

The means for turning off the self-holding means has been described above with reference to FIGS. 2 and 2A in which the clutch mechanism 21 is connected after confirming that the engine has been stopped. However, where the automobile is to be parked on a slope with transmission gears in mesh, the means for turning off the self-holding means may be actuated by applying a gear position signal from the gear transmission to the electronic control system 6 after confirming that the clutch mechanism is disconnected after the engine has been stopped, the gear transmission is then shifted into a first (low) gear position or a reverse gear position, and thereafter the clutch mechanism 21 is connected.

Figure 3A:
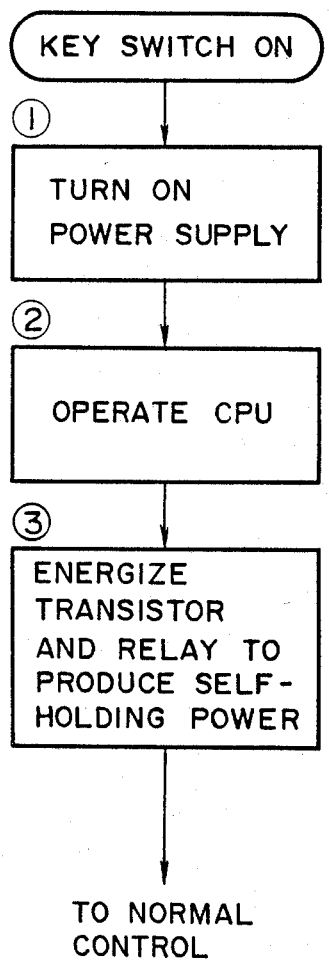
FIGS. 3(a) and 3(b) are flowcharts showing operation of the embodiment illustrated in FIG. 1.
Figure 3B:
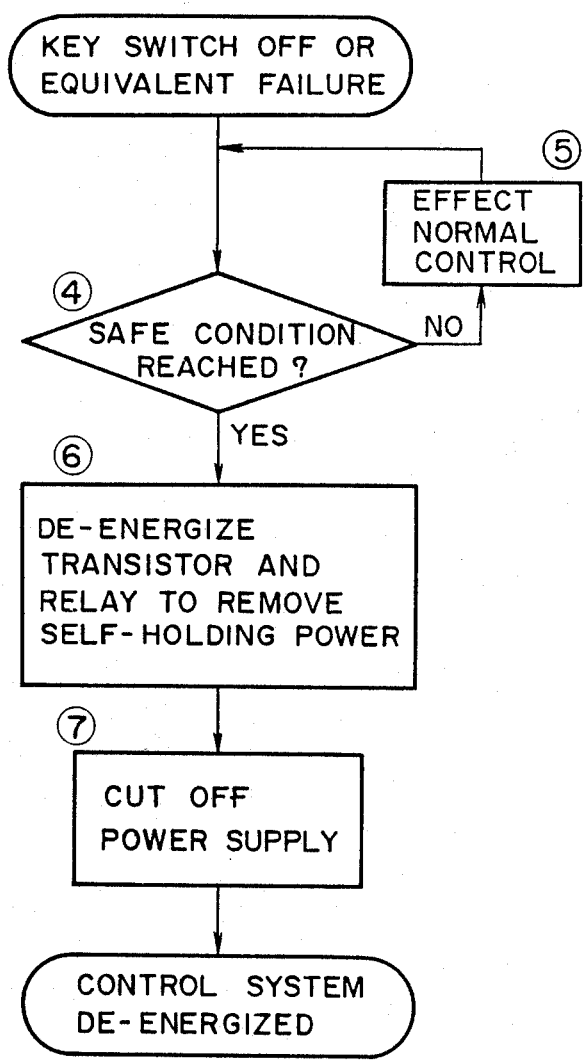

FIGS. 3(a) and 3(b) are flowcharts showing operation sequences for the embodiment shown in FIG. 1.

FIG. 3(a) shows an operation sequence to be executed after the key switch 2 is turned on. When the key switch 2 is turned on, the electric power from the battery 1 is supplied through the diode 10 to the constant-voltage regulated power supply 5 in a step 1, and the CPU 8b starts operating in a step 2. Then, a command is delivered via the input-output buffer 8c and the diode 12 to the driver transistor 7 to energize the power supply relay 4, thereby self-holding the electric power supplied to the electronic control system 6 in a step 3. The step 3 is followed by normal control.

FIG. 3(b) illustrates an operation sequence to be executed when the key switch 2 is turned off erroneously or the fuse is caused to melt. When the key switch 2 is turned off erroneously or the fuse melts in a step 4, normal control is carried out in a step 5. If the automobile is brought into a safe condition, such as when the clutch mechanism 21 is connected after the engine has stopped, as indicated by an external input applied to the input/output interface 8d, then control goes from the step 4 to a step 6 in which the driver transistor 7 is rendered non-conductive through the input/output buffer 8c and the diode 12 to de-energize the power supply coil of the relay 4, thereby turning off the self-holding means in a step 6. The electric power supplied to the electronic control system 6 is cut off in a step 7.

Figure 4A:
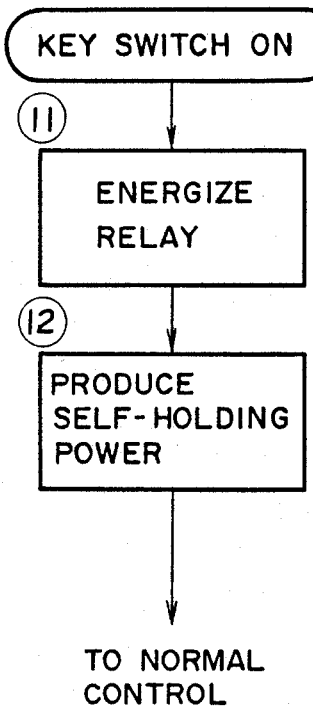
FIGS. 4(a) and 4(b) are flowcharts showing operation of the embodiment shown in FIG. 2.
Figure 4B:
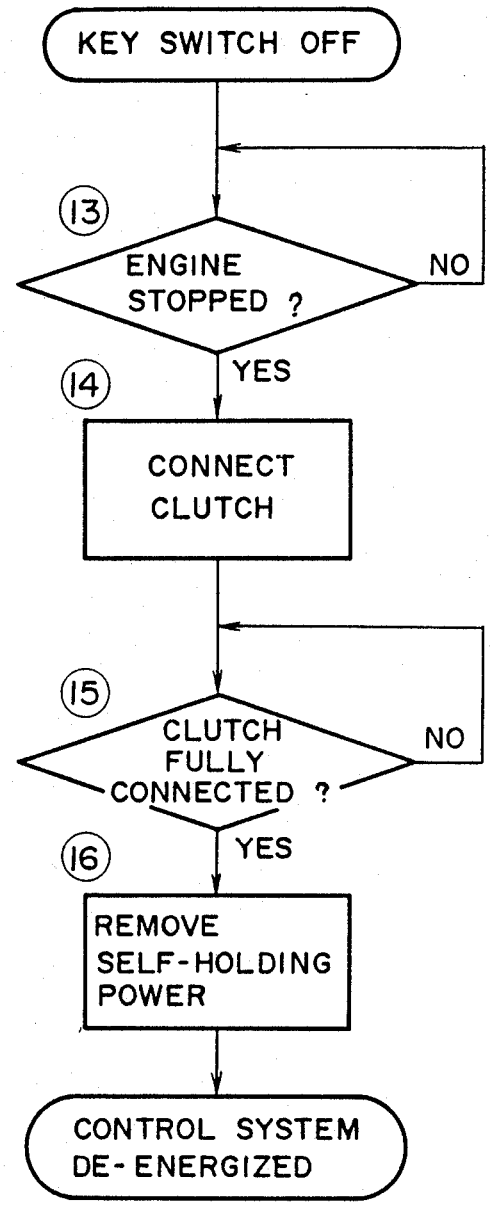

FIGS. 4(a) and 4(b) are flowcharts illustrating the operation sequences for the embodiment of FIGS. 2 and 2A.

FIG. 4(a) shows an operation sequence to be executed after the key switch 2 is turned on. When the key switch 2 is turned on, the coil of the power supply relay 4 is energized by the electronic control system 6 to connect the contacts of the relay 4 in a step 11. The electric power supplied to the electronic control system 6 is held in a step 12 to allow the electronic control system 6 to effect normal control.

FIG. 4(b) illustrates an operation sequence to be carried out when the key switch 2 is turned off. The electronic control system 6 reads in the signal from the engine rotation sensor 20 in a step 13. After confirming that the engine is stopped, the electronic control system 6 issues a command to enable the clutch actuator 29 to connect the clutch mechanism 21 in a step 14. Then, the electronic control system 6 reads in the signal from the stroke sensor 35 to determine the condition of the clutch mechanism 21 in a step 15. If the clutch mechanism 21 is fully connected, then control proceeds to a step 16 in which the power supply relay 4 is de-energized to cut off the electric power supplied to the electronic control system 6 through the self-holding means, whereupon the operation sequence is completed.

Figure 5:
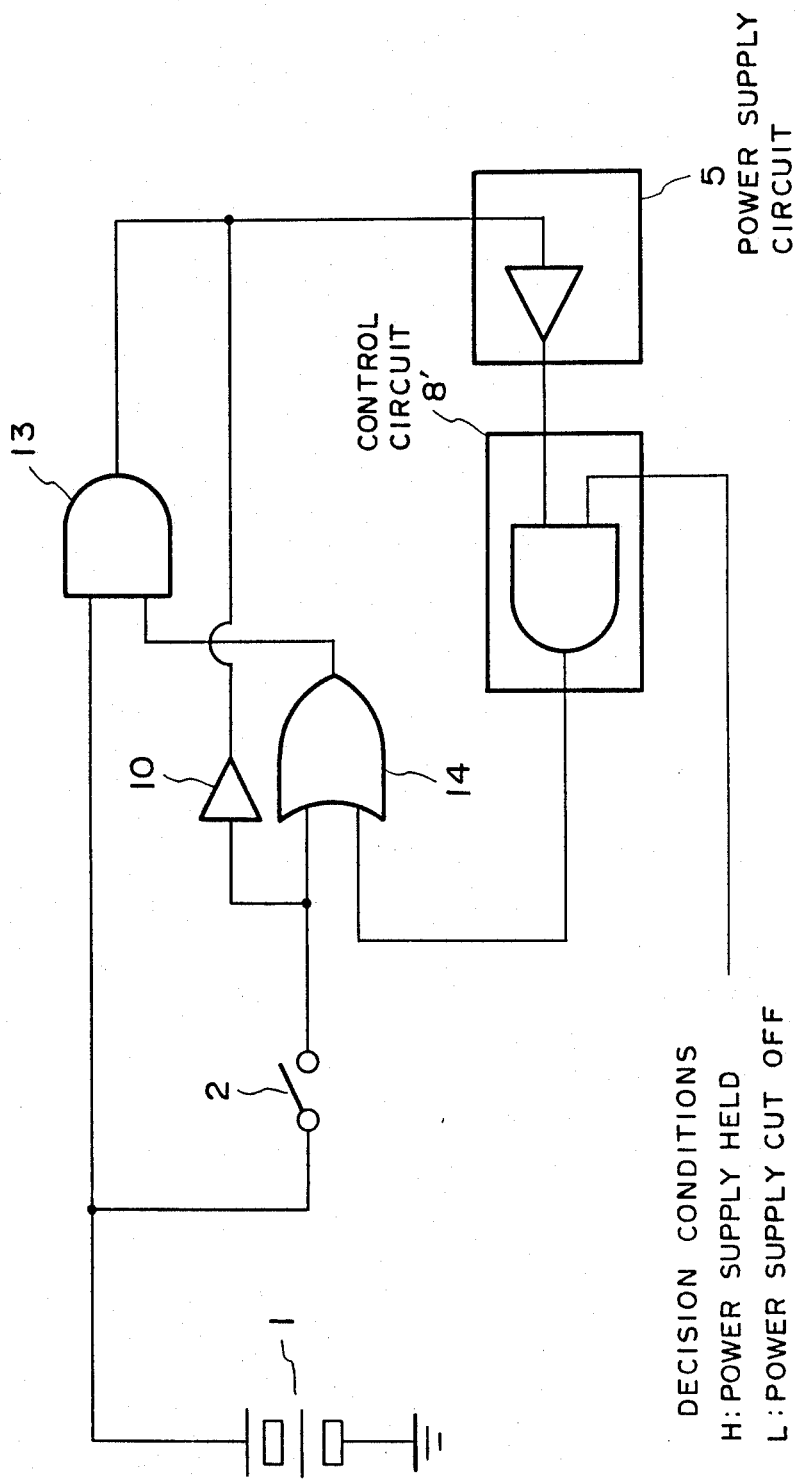
FIG. 5 is a schematic circuit diagram of an equivalent circuit, in the form of a logic circuit, of the embodiment shown in FIG. 1.

FIG. 5 is a schematic circuit diagram illustrative of an equivalent circuit of the embodiment of FIG. 1, the circuit being in the form of a logic circuit. The circuit includes an AND gate 13 representative of the power supply relay 4, and an OR gate 14 indicative of the diodes 11, 12 and the driver transistor 7. When an input of a high level (H) is applied to a control circuit 8' after the key switch 2 has been turned on, the electric power from the battery 1 is continously applied, and when an input of a low level (L) is applied to the control circuit 8' after the key switch 2 has been turned on, the electric power from the battery 1 is cut off.

Figure 6:
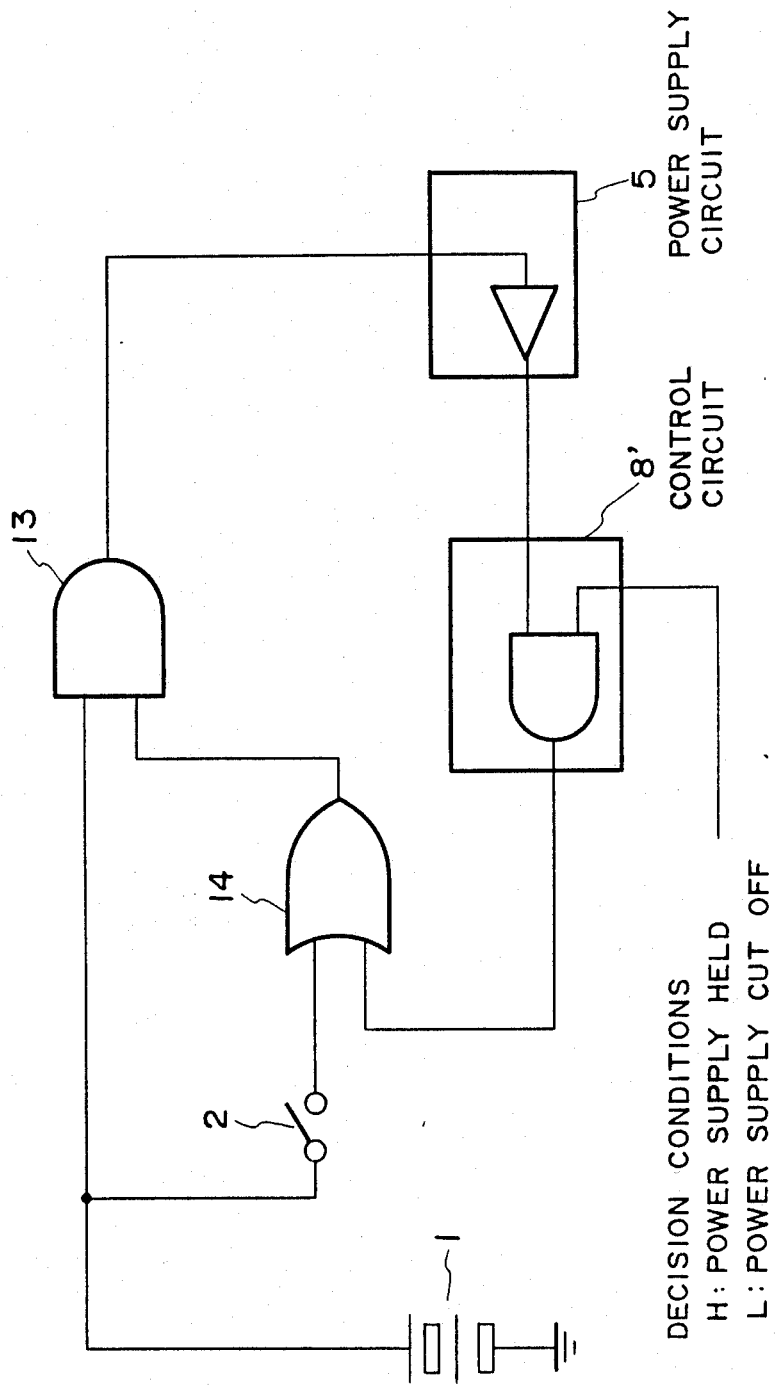
FIG. 6 is a schematic circuit diagram of an equivalent circuit, in the form of a logic circuit, of the embodiment shown in FIG. 2.

FIG. 6 shows a schematic circuit diagram of an equivalent circuit, in the form of a logic circuit, of the embodiment illustrated in FIG. 2. The circuit includes an AND gate 13 representative of the power supply relay 4, and an OR gate 14 indicative of the diodes 11, 12 and the driver transistor 7, as with the equivalent circuit shown in FIG. 5. H and L inputs applied to the control circuit 8' indicate whether the self-holding means is to remain turned on, or be turned off.

Figure 7:
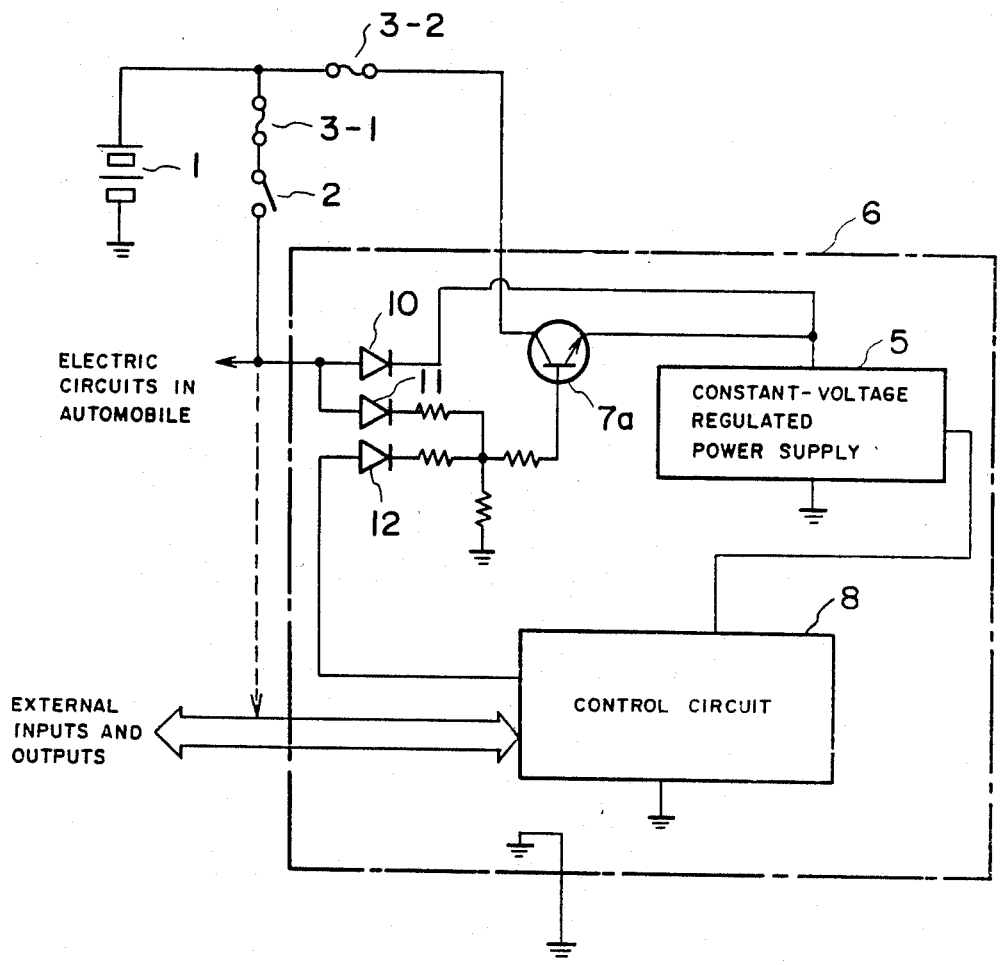
FIG. 7 is a schematic circuit diagram of a modification of the embodiment of the present invention as shown in FIG. 1.

According to a modification, shown in FIG. 7, of the embodiment shown in FIG. 1, the power supply relay 4 is replaced with a transistor 7a for controlling a large current. The elements in FIG. 7 which are identical to those of FIG. 1 are denoted by identical reference characters and will not be described in detail. As shown in FIG. 7, the cathodes of the diodes 11, 12 for preventing a current from flowing back are connected to the base of the transistor 7a, with the collector coupled to the fuse 3-2 and the emitter to the constant-voltage regulated power supply 5. When a signal is applied via the diode 11 or 12 to the base of the transistor 7a, the transistor 7a is rendered conductive to supply the electric power from the battery 1 to the constant-voltage regulated power supply 5. The same self-holding ability as described above with reference to FIG. 1 is therefore provided by the circuit arrangement of FIG. 7.

Figure 8:
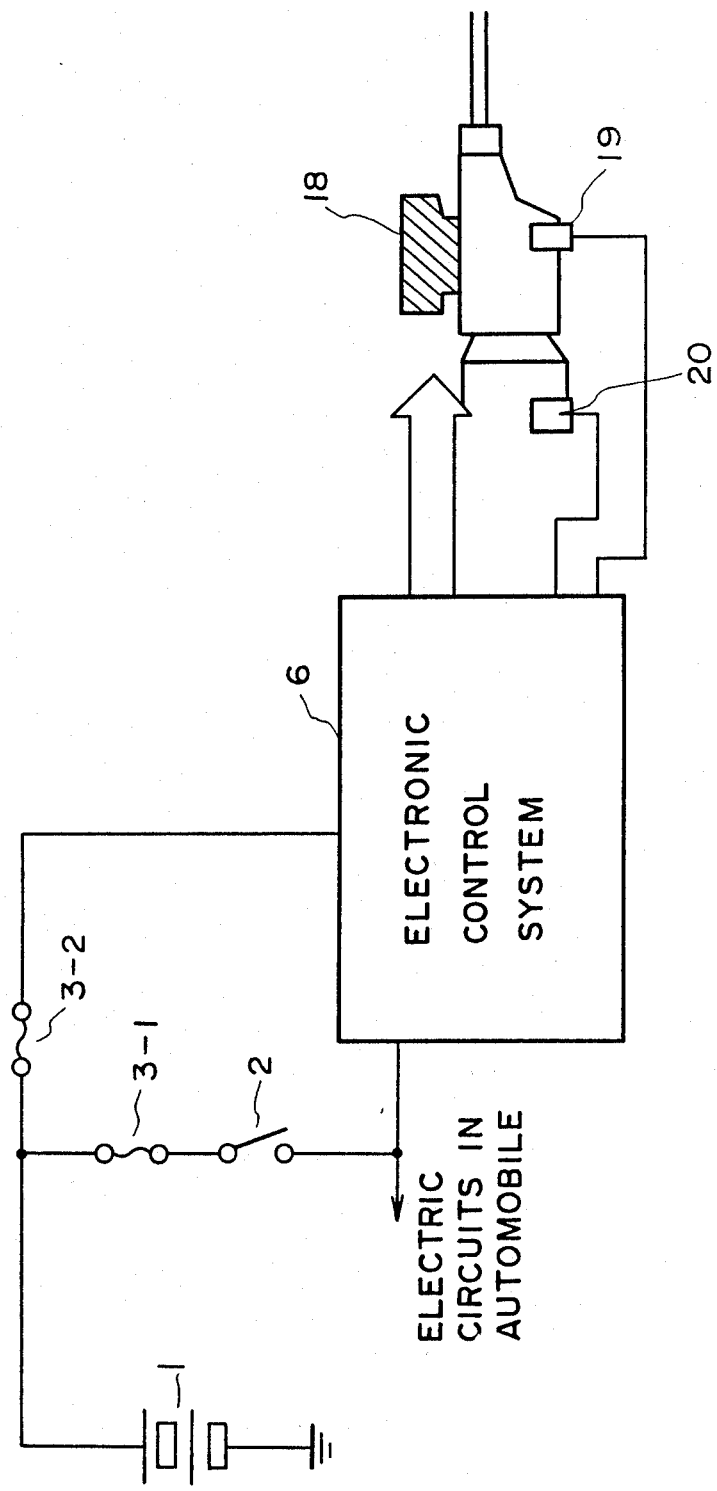
FIG. 8 is a schematic diagram of a modification of the embodiment of the present invention as shown in FIG. 1.

FIG. 8 is a schematic diagram showing a modification of the embodiment of FIG. 1, employed for controlling a gear transmission. Denoted at 18 is a gear transmission control unit, 19 an automobile speed sensor mounted on a gear transmission, and 20 an engine rotation sensor. The electronic control system 6 applies a command for controlling gear positions to the gear transmission control unit 18, and is supplied with detected signals from the automobile speed sensor 19 and the engine rotation sensor 20.

When the key switch 2 is turned off in error or the fuse 3-1 is caused to melt while the automobile is running, the electronic control system 6 holds the electric power supplied through the self-holding means, and also reads in the signals from the engine rotation sensor 19 and the automobile speed sensor 20. Until these signals indicate that the engine and the automobile are stopped, the electronic control system 6 continuously delivers an appropriate signal to the gear transmission control unit 18 to control the running of the automobile, even after an unexpected cutoff of the electric power during travel of the automobile has occurred.

FIG. 9 is a schematic circuit diagram illustrating a modification of the embodiment of FIG. 2, employed for clutch control. In FIG. 9, a frequency-to-voltage converter 16 serves to convert the frequency of a pulse signal from the engine rotation sensor 20 to a voltage. A clutch control circuit 17 controls the clutch actuator 29 and also controls the driver transistor 7 in response to a signal from the stroke sensor 35.

The frequency-to-voltage converter 16 receives the signal from the engine rotation sensor 20 and converts the frequency thereof to a voltage proportional thereto. Therefore, while the engine is rotating, the frequency-to-voltage converter 16 produces an output voltage corresponding to the rotation of the engine to render the driver transistor 7 conductive, thereby keeping the electric power supplied to the electronic control system 6. When the engine is stopped and a signal indicative of the full clutch connection is supplied from the stroke sensor 35, the power supply relay 4 is de-energized by the frequency-to-voltage converter 16 and the clutch control circuit 17 via the driver transistor 7. Accordingly, the electric power supplied to the electronic control system 6 is cut off.

Although certain preferred embodiments have been shown and described, it should be understood that many changes and modifications may be made therein without departing from the scope of the appended claims.

What we claim is:

1. A power supply control device for supplying electric power to an electronic control system for controlling an engine and a transmission in an automobile, comprising:
   (a) main supply means for supplying electric power from a power supply in the automobile to at least the electronic control system;
   (b) self-holding means, separate from said main supply means, for continuously supplying electric power to the electronic control system when the electric power supplied by said main supply means to the electronic control system is cut off;

(c) an engine rotation sensor for detecting rotation of the engine in the automobile and for emitting a rotation signal in dependence upon the rotation of the engine; and (d) power cutoff means for cutting off the electric power supplied, by said self-holding means, to the electronic control system when a job executed by the electronic control system is finished and the rotation signal from said engine rotation sensor indicates non-rotation of the engine, after the electric power supplied by said main supply means to the electronic control system has been cut off.

2. A power supply control device according to claim 1, wherein said main supply means comprises means, including a key switch of the automobile, for supplying electric power to the electronic control system.

3. A power supply control device according to claim 1, wherein said self-holding means includes a relay for making and breaking connection of said self-holding means to the electronic control system.

4. A power supply control device according to claim 1, wherein said self-holding means includes an electronic switching element for making and breaking connection of said self-holding means to the electronic control system.

5. A power supply control device according to claim 1, wherein said electronic control system issues a self-holding signal to said self-holding means for supplying electric power from said self-holding means to the electronic control system while said main supply means supplies electric power to said electronic control system from the power supply.

6. A power supply control device according to claim 2, wherein said self-holding means includes a relay for making and breaking connection of said self-holding means to the electronic control system.

7. A power supply control device according to claim 2, wherein said self-holding means includes an electronic switching element for making and breaking connection of said self-holding means to the electronic control system.

8. A power supply control device for supplying electric power to an electronic control system for controlling an engine and a transmission in an automobile, comprising:

(a) main supply means for supplying electric power from a power supply in the automobile to at least the electronic control system;

(b) self-holding means, separate from said main supply means, for continously supplying electric power to the electronic control system when the electric power supplied by said main supply means to the electronic control system is cut off;

(c) an automobile speed sensor for detecting the speed of the automobile and for emitting a speed signal in dependence upon the speed of the automobile; and (d) power cutoff means for cutting off the electric power supplied by said self-holding mans to the electronc control system, when a job executed by the electronic control system is finished and the speed signal from said automobile speed sensor is no longer supplied, after the electric power supplied by said main supply means to the electronic control system has been cut off.

9. A power supply control device according to claim 8, wherein said main supply means comprises means, including a key switch of the automobile, for supplying electric power to the electronic control system.

10. A power supply control device according to claim 9, wherein said self-holding means includes a relay for making and breaking connection of said self-holding means to the electronic control system.

11. A power supply control device according to claim 9, wherein said self-holding means includes an electronic switching element for making and breaking connection of said self-holding means to the electronic control system.

12. A power supply control device according to claim 8, wherein said electronic control system issues a self-holding signal to said self-holding means for supplying electric power from said self-holding means to the electronic control system while said main supply means supplies electric power to said electronic control system from the power supply.

13. A power supply control device according to claim 8, wherein said self-holding means includes a relay for making and breaking connection of said self-holding means to the electronic control system.

14. A power supply control device according to claim 8, wherein said self-holding means includes an electronic switching element for making and breaking connection of said self-holding means to the electronic control system.

15. A power supply control device for supplying electric power to an electronic control system for controlling an engine, a clutch and a transmission in an automobile, comprising:

(a) main supply means for supplying electric power from a power supply in the automobile to at least the electronic control system;

(b) self-holding means, separate from said main supply means, for continously supplying electric power to the electronic control system when the electric power supplied by said main supply means to the electronic control system is cut off;

(c) an engine rotation sensor for detecting rotation of the engine in the automobile and for emitting a rotation signal in dependence upon the engine rotation;

(d) means for detecting whether the clutch in the automobile is engaged; and (e) power cutoff means for cutting off the electric power supplied, by said self-holding means, to the electronic control system when a job executed by the electronic control system is finished, the rotation signal from said engine rotation sensor indicates non-rotation of the engine and the clutch is engaged, after the electric power supplied by said main supply means to the electronic control system has been cut off.

16. A power supply control device according to claim 15, wherein said main supply means comprises means, including a key switch of the automobile, for supplying electric power to the electronic control system.

17. A power supply control device according to claim 16, wherein said self-holding means includes a relay for making and breaking connection of said self-holding means to the electronic control system.

18. A power supply control device according to claim 16, wherein said self-holding means includes an electronic switching element for making and breaking connection of said self-holding means to the electronic control system.

19. A power supply control device according to claim 15, wherein said electronic control system issues a self-holding signal to said self-holding means for supplying electric power from said self-holding means to the electronic control system while said main supply means supplies electric power to said electronic control system from the power supply.

20. A power supply control device according to claim 15, wherein said self-holding means includes a relay for making and breaking connection of said self-holding means to the electronic control system.

21. A power supply control device according to claim 15, wherein said self-holding means includes an electronic switching element for making and breaking connection of said self-holding means to the electronic control system.

* * * * *